Nov. 25, 1969      W. BUCKSTEEG ET AL      3,480,542
METHOD AND APPARATUS FOR THE PURIFICATION OF WASTE WATER
Filed April 10, 1967      2 Sheets-Sheet 1

INVENTORS
WILHELM BUCKSTEEG
HANS THIELE
BY *Petherbridge, O'Neill & Aubel*
ATTORNEYS.

United States Patent Office 3,480,542
Patented Nov. 25, 1969

3,480,542
METHOD AND APPARATUS FOR THE
PURIFICATION OF WASTE WATER
Wilhelm Bucksteeg and Hans Thiele, Essen, Germany, assignors to Passavant-Werke, Michelbacherhutte, Germany, a corporation of Germany
Filed Apr. 10, 1967, Ser. No. 629,652
Claims priority, application Germany, Apr. 9, 1966, 1,584,866; July 16, 1966, 1,584,867
Int. Cl. B01d 29/08, 29/02
U.S. Cl. 210—20    32 Claims

ABSTRACT OF THE DISCLOSURE

A method and apparatus for treating sewage wherein carbonized sludge smolder coke forms a filter bed for clarifying effluent separated from the sludge. The smolder coke may also be mixed with the sewage sludge for accelerating decomposition thereof.

---

This invention relates to treatment of sewage and is more particularly directed to the purification of wastes and other effluents containing putrifiable organic matter.

In Bucksteeg et al. U.S. Patent No. 3,275,547 there is disclosed a method of treating raw sewage with partially carbonized sludge (sludge coke) and use of the sludge coke as an additive to sewage to be purified for accelerating decomposition of the sewage, for promoting settling action of the sewage, and for dewatering of the sludge.

The present invention constitutes an improvement over the invention disclosed in said patent by providing new and improved methods, systems and apparatus for eliminating the separate mixing and sedimentation basins heretofore required in the art and by providing new and improved methods, systems and apparatus for enhancing clarification of the effluent separated from sludge.

It is therefore an object of the present invention to provide new and improved methods, systems, and apparatus for the treatment of sewage and waste waters, particularly household wastes.

Another object of the present invention is to provide new and improved methods, systems, and apparatus for separation and clarification of sludge and its aqueous carrier.

Still another object of the present invention is to provide new and improved methods, systems and apparatus for clarifying effluent separated from sludge with partially carbonized coke obtained from heating of the sludge.

A further object of the present invention is to provide new and improved methods, systems and apparatus for separation of sludge from its aqueous carrier and for clarification of the effluent by countercurrent movement of the effluent and of partially carbonized coke obtained from heating of sludge.

A still further object of the present invention according to the preceding object is to provide continuous methods and apparatus for separation and clarification in sewage treatment processes.

These and other objects, features and advantages of the present invention will become readily apparent from a careful consideration of the following detailed description when considered in conjunction with the accompanying drawings, illustrating preferred embodiments of the present invention, wherein like reference numerals and characters refer to like and corresponding parts throughout the several views, and wherein.

Figure 1:
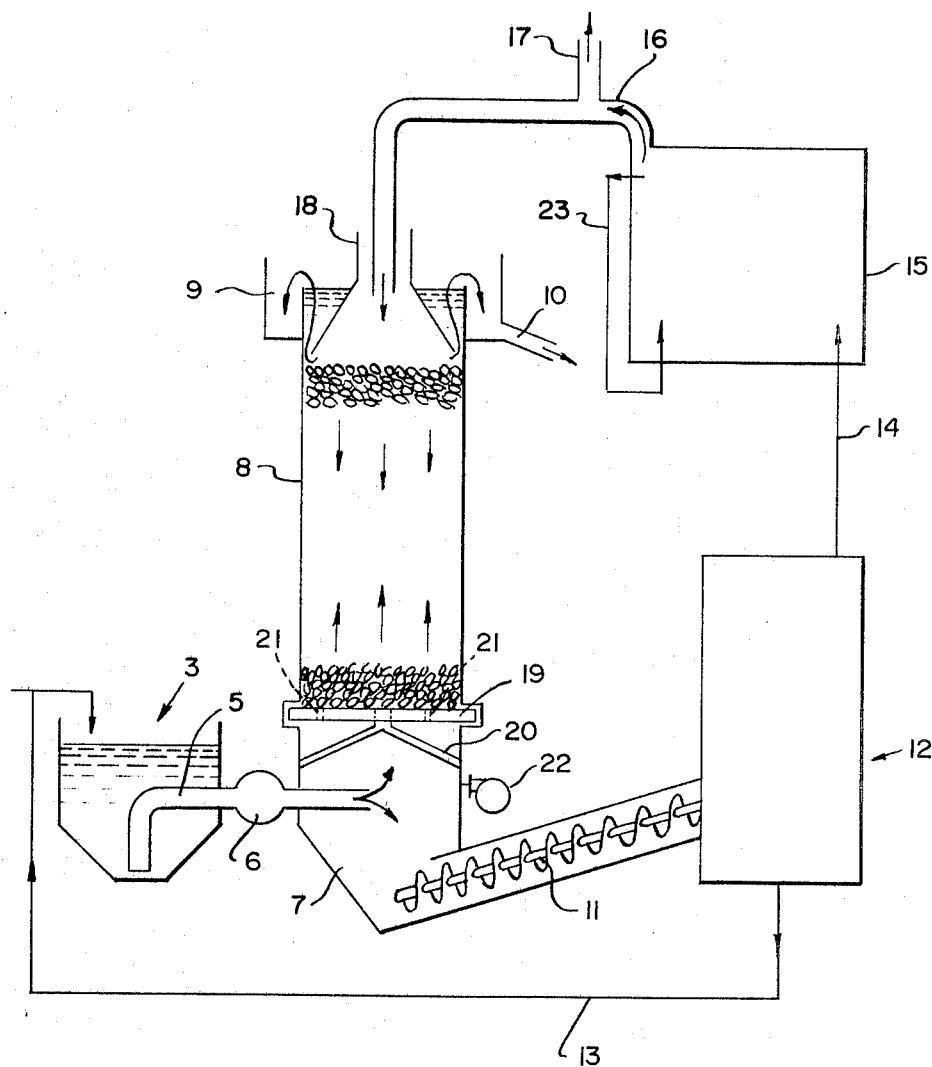
FIGURE 1 is a generally schematic view of a preferred embodiment of a system for performing methods of the present invention.

Referring to FIGURE 1 there is shown a system for both separation of sludge from its liquid carrier and for clarification of the carrier by movement of the carrier through a filter bed media containing a partially carbonized smolder coke obtained by thermal decomposition of sewage sludge previously separated from the carrier. The apparatus illustrated in FIG. 1 is a continuous closed loop arrangement both for producing the partially carbonized coke and for clarifying of the carrier effluent.

The system disclosed in FIG. 1 includes a waste water supply tank or reservoir 3 from which sludge containing-waste water is moved over a line 5 under the influence of a pump 6 into a settling or sedimentation chamber 7.

Under the influence of the pump 6, the effluent is moved into an effluent clarification tank 8 which contains a bed of partially carbonized smolder coke obtained by heating at least a portion of a previous batch of the sewage sludge, as described more fully hereinafter. The clarified effluent is discharged, as indicated by the arrows in FIG. 1, from chamber 8 into a collector chamber 9 which, as shown in FIG. 1, is concentric with the clarifier chamber 8 and settling chamber 7. The chambers 8 and 9 may be any geometric shape desired. From the collector 9, the clarified effluent is discharged by a conduit 10 to a reservoir (not shown).

The sludge which settles in the bottom in chamber 7 is moved by means, such as a screw conveyor 11, into a press unit 12 for dewatering of the sludge. It will be appreciated that one or more screw conveyors may be employed, as desired. Because the present system is a continuous system, the press unit 12 may be in the form of a rolling press presently used for briquetting or other well known means which remove water from the sludge may be used, such as filters. The water separated from the sludge in the press unit 12 may be returned by a conduit 13 to the reservoir 3.

The partially dewatered sludge is supplied from the press unit 12 by a conduit 14 to a coking oven 15 where the sludge is subjected to smolder heating distillation in the absence of oxygen at a temperature in excess of about 600° C. The coke oven 15 may be of conventional construction and, if desired, the gas produced in the coking over 15 may be utilized to enhance burning by use of a burner arrangement 23. The resulting sludge smolder coke produced in the oven 15 is at least partially carbonized and is removed from the coking oven 15 through a conduit 16 and deposited on the top of the catalyst bed in the clarifier chamber 8, the top portion of which is defined by a bell-shaped hood 18. Excess coke may, if desired, be removed from the conduit 16 through a by-pass conduit 17.

The filter bed is supported in the chamber 8 on rotatable scraper wheel means 19. Scraper wheel means 19 is supported in chamber 8 for rotation by a spider arrangement 20. The scraper wheel 19 has a plurality of radially extending slots 21 through which effluent moves upwardly and into the chamber 8. Scraper strips (not shown) are employed to scrape sludge contaminated coke from the bottom of the bed in chamber 8 through the slots 21.

Operation of the scraper wheel means 19 may be pressure controlled, so that when the pressure, for example, in the conveyor area 11 reaches a predetermined value, as the result of accumulation of sludge, the scraper wheel means, which is normally stationary, may be rotated via electrical means (not shown) in slow rotation, so that the scraper strips (not shown) peel the lower sludge accumulated filter layer from the bed in chamber 8 and discharge the mixture of sludge and coke through the slots 21 into the chamber 7 where this mixture mixes with raw sludge. Subsequently, the coke and sludge is moved from chamber 7 by the conveyor means 11 into the press 12. Air supply in the system may be controlled through a pump 22, as required.

Generally, the raw sludge contains adequate ceramic or binder material to produce catalyzer coke masses for the bed in chamber 8; however, such materials may be supplied to the press 12, as required.

It will be appreciated that the controls for the scraper 19, conveyor 11, pumps, press 12, and oven 15 may be synchronized for automatic continuous operation of the system.

Thus, in operation, a sludge containing waste water is supplied from the reservoir 3 over line 5 under the influence of pump 6 into the chamber 7. The effluent is supplied under the influence of pump 6 through the bed of partially carbonized sludge coke in chamber 8 and the clarified effluent flows over the weir at the top of chamber 8 into the collection chamber 9 for discharge through the outlet 10.

The sludge settling in chamber 7 is moved by the conveyor 11 from the chamber 7 into the press 12.

The sludge is dewatered in the press 12. The water is removed from the press 12 over line 13 and is returned to the reservoir 3. The dewatered sludge is then moved over line 14 into the coking oven 15, where it is partially carbonized. The partially carbonized sludge coke is then supplied over line 16 onto the top of the filter bed in the chamber 8.

In response to a predetermined signal, the scraper wheel means 19 operates to scrape and discharge sludge coated coke from the bottom of the bed in chamber 8 through the outlets 21 into the chamber 7 where it settles with the raw sludge at the bottom of chamber 7. The raw sludge and mixture of sludge and coke from the chamber 7 is moved by the conveyor 11 into the press 12 for dewatering. The water is returned over line 13 from press 12 to the reservoir 3 and the pressed raw sludge mixed with the mixture of coke and sludge is now conveyed over line 14 to the coke smolder oven 15. The raw sludge and the sludge from the mixture of coke and sludge are partially carbonized in oven 15 to produce additional material for the filter bed in chamber 8.

If desired, other organic foreign matters such as garbage fractions and disintegrated screening may be added to the conveyor 11, and a portion of the sludge may be removed from the chamber 7 for other disposition.

It will thus be appreciated that the system of FIG. 1 provides efficient and economical means for utilization of sludge in coke form as an effluent clarification media in a sewage treatment system operable on a continuous or batch basis.

Figure 2:
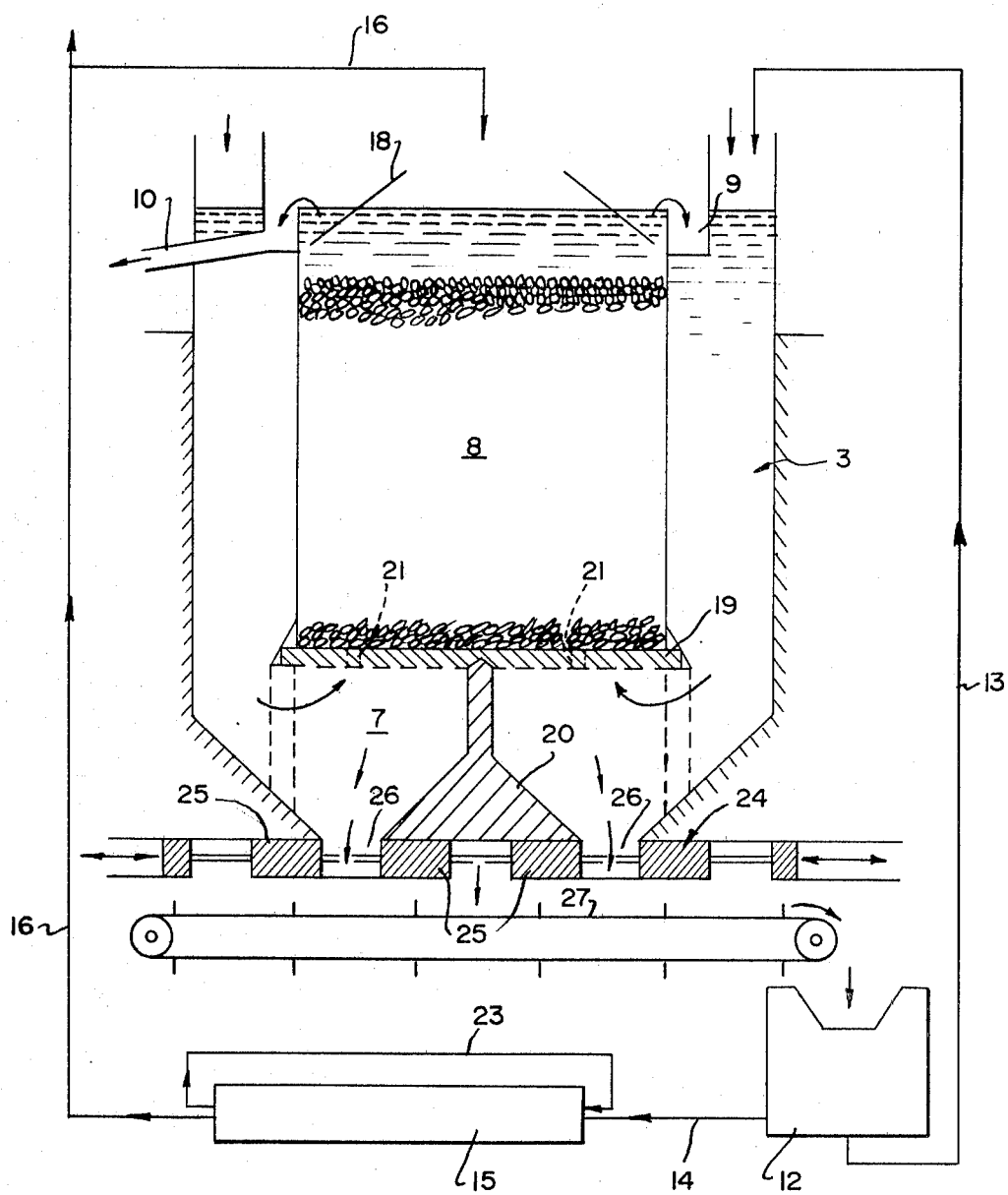
FIGURE 2 is a generally schematic view of a second embodiment of a system for performing methods of the present invention.

Referring now to FIG. 2, there is disclosed a continuous waste treatment system wherein the reservoir 3 and filter bed tank 8 are one within the other, concentric and have a common dividing wall defining the inner filter bed chamber 8. Flow of the carrier effluent in this system is controlled hydrostatically rather than by pump means.

In this arrangement the crude water is supplied into chamber 3 from a location adjacent the upper portion thereof and passes into the chamber 7 from a location at the bottom thereof. Through the apertures 21 of the scraper wheel 19 effluent passes into the tank 8 flowing upwardly over the side of the chamber 8 into the accumulation chamber 9 for discharge of clarified effluent through the clarified effluent outlet 10. It is noted that the accumulation chamber 9 is also concentric with chambers 3 and 8 and is partially within at least chamber 3 to provide a more compact and economical arrangement of chambers.

The sludge in chamber 7 settles to the bottom of the chamber.

Substituted for the screw conveyor 11 in FIGURE 1 is a reciprocating horizontally disposed piston arrangement 24 carrying a plurality of spaced pistons 25. The chamber 7 is open in a plurality of locations at the bottom thereof to provide outlets 26 for passage from the chamber 7 of the settled sludge and carbonized sludge coke. The pistons are disposed to remove sections or portions of the sludge passing through the outlets 26 from the chamber 7. The outlets 26 are located so that the portions of sludge removed by the pistons deposit on an endless belt 27. The conveyor 27 supplies the portions of the sludge to the press 12. The water removed from the sludge is supplied from the press 12 over line 13 for return to the chamber 3. The pressed sludge is supplied over the line 13 into the smoldering oven 15 for production of partially carbonized coke. The carbonized coke is then supplied over line 16 onto the top of the filter bed in chamber 8, to replenish any carbonized sludge coke of the bed removed through the openings 21 formed in the scraper wheel 19 and discharged into the tank 7 for mixture with raw sludge settling in the tank 7.

It will, therefore, be appreciated that the present invention provides new and improved methods, systems and apparatus for clarifying effluent in waste treatment applications whereby sludge is converted to clarfiying filter media for the effluent and used filter media is combined with raw sludge for formation of replacement filter media. Moreover, operation of the system and apparatus may be either continuous or batch and the flow of the aqueous carrier of the sludge may be either pump or hydrostatically operated.

We claim:

1. In apparatus for treating raw sewage, a tank including a chamber for receiving raw sewage, means for settling sewage sludge from said raw sewage while concurrently separating said sludge from the effluent of the sewage, means for cokifying said sludge to produce at least partially carbonized sludge smolder coke, means in said tank including a perforated platform for receiving, supporting and forming an effluent clarifying bed with said coke, means for passing said effluent from said chamber through said perforated platform and through said bed to clarify the effluent means for removing a portion of said coke from said bed by moving the coke from the bed through the platform to the said chamber and for mixing said coke with sewage sludge settled from additional raw sewage, and means for supplying the mixture of sludge and coke to said cokifying means to produce at least partially carbonized sludge smolder coke from said sludge and to supply the mixture of said coke to said bed.

2. In the apparatus of claim 1 wherein the bed moves counter-current to the direction of movement of the effluent.

3. In the apparatus of claim 1 wherein the sludge is subjected at temperatures of approximately 600° C. in the absence of oxygen to smolder heat distillation to form at least partially carbonized smolder coke in said cokifying means.

4. In the apparatus of claim 1 wherein said effluent receiving and bed forming means is a tank concentrically arranged above the settling tank, and said removing means is scraper means disposed in one of said tanks for removing sludge from said bed.

5. In the apparatus of claim 1 wherein said means for separating said sludge includes screw conveyor means.

6. In the apparatus of claim 1 wherein said effluent passes through said bed under pressure.

7. In the apparatus of claim 6 wherein said effluent passes through said bed under the influence of pump means.

8. In the apparatus of claim 6 wherein said effluent passes through said bed under the influence of hydrostatic pressure.

9. In the apparatus of claim 1 wherein said means includes piston means for separating said sludge.

10. In the apparatus of claim 9 wherein said piston means are located adjacent outlets in said settling means and conveyor means receives said separated sludge.

11. In the apparatus of claim 1 wherein said mixture of coke is added at a first location to one end of said bed and said portion of coke is removed from a second location at another end of said bed.

12. In the apparatus of claim 11 wherein said effluent passes through said bed from said second location to said first location.

13. In the apparatus of claim 12 wherein said first location is adjacent the top of the bed and the second location is adjacent the bottom of the bed.

14. In the apparatus of claim 1 including raw sewage storage means for supplying raw sewage to said settling means.

15. In the apparatus of claim 14 wherein said raw sewage storage means and said effluent bed means are tanks, one within the other.

16. In the apparatus of claim 15 wherein said tanks are concentric tanks.

17. In the apparatus of claim 15 wherein said tanks are coaxial.

18. In the apparatus of claim 15 wherein said tanks are concentric and coaxial tanks.

19. In the apparatus of claim 1 including additional means for dewatering the sludge prior to cokifying thereof.

20. In the apparatus of claim 19 wherein the sludge is subjected at temperatures of approximately 600° C. in the absence of oxygen to smolder heat distillation to form at least partially carbonized smolder coke in said cokifying means.

21. In the apparatus of claim 19 wherein the sludge is dewatered by press means.

22. In the apparatus of claim 21 including means to supply water from said press means to said settling tank.

23. In the method of treating raw sewage, the steps comprising receiving raw sewage sludge in a chamber, settling a sewage sludge from said raw sewage while concurrently separating said sludge from the effluent of the sewage, cokifying said sludge to produce at least partially carbonized sludge smolder coke, forming an effluent clarifying bed with said coke, supporting said bed on a perforated platform, passing said effluent from said chamber through said perforated platform and through said bed to clarify the effluent, removing a portion of said coke from said bed through the said platform to the said chamber and mixing it with sewage sludge settled from additional settled raw sewage to accelerate decomposition thereof, cokifying the sludge in said mixture to produce at least partially carbonized sludge smolder coke and supplying the mixture of said coke to said bed.

24. In the method of claim 23 wherein said effluent passes through said bed under the influence of pressure means.

25. In the method of claim 23 wherein the bed moves counter-current to the direction of movement of the effluent.

26. In the method of claim 23 wherein the sludge is subjected at temperatures of approximately 600° C. in the absence of oxygen to smolder heat distillation to form at least partially carbonized coke.

27. In the method of claim 23 wherein said mixture of coke is added at a first location to one end of said bed and said portion of coke is removed from a second location at another end of said bed.

28. In the method of claim 27 wherein said effluent passes through said bed from said second location to said first location.

29. In the method of claim 28 wherein said first location is adjacent the top of the bed and the second location is adjacent the bottom of the bed.

30. In the method of claim 23 including the additional step of dewatering the sludge prior to cokifying thereof.

31. In the method of claim 30 wherein the sludge is dewatered by pressing.

32. In the method of claim 30 wherein the sludge is subjected at temperatures of approximately 600° C. in the absence of oxygen to smolder heat distillation to form at least partially carbonized coke.

References Cited

UNITED STATES PATENTS

| | | | |
|---|---|---|---|
| 1,967,197 | 7/1934 | Besselievre | 210—68 |
| 2,080,780 | 5/1937 | Mars | 210—20 X |
| 2,613,181 | 10/1952 | Green et al. | 210—20 |
| 2,754,343 | 7/1956 | Maisel | 210—20 X |
| 3,103,488 | 9/1963 | Griffin | 210—20 X |
| 3,275,547 | 9/1966 | Bucksteeg et al. | 210—5 |
| 3,279,603 | 10/1966 | Busse | 210—259 X |
| 3,327,855 | 6/1967 | Watson et al. | 210—260 X |

REUBEN FRIEDMAN, Primary Examiner

F. A. SPEAR, JR., Assistant Examiner

U.S. Cl. X.R.

210—40, 67, 71, 73, 256, 257, 258, 260, 265